(12) United States Patent
Noll

(10) Patent No.: US 8,627,792 B2
(45) Date of Patent: Jan. 14, 2014

(54) ADJUSTING DEVICE

(75) Inventor: Michael Noll, Königstein (DE)

(73) Assignee: Continental Automotive GmbH, Hannover (DE)

( * ) Notice: Subject to any disclaimer, the term of this patent is extended or adjusted under 35 U.S.C. 154(b) by 41 days.

(21) Appl. No.: 13/320,198

(22) PCT Filed: May 10, 2010

(86) PCT No.: PCT/EP2010/056377
§ 371 (c)(1),
(2), (4) Date: Nov. 11, 2011

(87) PCT Pub. No.: WO2010/130693
PCT Pub. Date: Nov. 18, 2010

(65) Prior Publication Data
US 2012/0048240 A1 Mar. 1, 2012

(30) Foreign Application Priority Data
May 11, 2009 (DE) .......................... 10 2009 020 734

(51) Int. Cl.
*F01L 1/34* (2006.01)
(52) U.S. Cl.
USPC ................ 123/90.17; 123/90.15; 251/129.01; 464/160
(58) Field of Classification Search
USPC ........... 123/90.11, 90.15, 90.17; 251/129.01; 464/160
See application file for complete search history.

(56) References Cited

U.S. PATENT DOCUMENTS

| | | | |
|---|---|---|---|
| 4,181,474 A * | 1/1980 | Shaw | 417/366 |
| 5,222,874 A * | 6/1993 | Unnewehr et al. | 417/372 |
| 6,386,056 B1 | 5/2002 | Bachnak et al. | |
| 7,486,962 B2 * | 2/2009 | Zuberi et al. | 455/523 |
| 2003/0015926 A1 | 1/2003 | Blatter et al. | |
| 2007/0241627 A1 | 10/2007 | Kharsa | |

FOREIGN PATENT DOCUMENTS

| | | |
|---|---|---|
| DE | 86 32 779.8 U1 | 3/1987 |
| DE | 198 31 739 A1 | 1/2000 |
| DE | 103 30 871 A1 | 1/2005 |
| DE | 103 52 677 A1 | 6/2005 |
| JP | 1 264545 | 10/1989 |
| JP | 1264545 A | 10/1989 |
| JP | 9 070156 | 3/1997 |
| JP | 9-070156 A | 3/1997 |
| JP | 2003-047201 | 2/2003 |
| JP | 2003-254023 | 9/2003 |
| JP | 2005-113861 | 4/2005 |
| JP | 2008-007023 | 1/2008 |
| JP | 2008-082224 | 4/2008 |
| JP | 2008-263921 | 11/2008 |
| WO | WO 2005005791 A1 * | 1/2005 |

* cited by examiner

*Primary Examiner* — Ching Chang
(74) *Attorney, Agent, or Firm* — Cozen O'Connor

(57) ABSTRACT

An adjusting device including an electric motor that has a motor housing, the shaft of the motor running perpendicularly upwards from the electric motor and supporting a gearwheel of an actuating transmission. Oil is conducted from an oil outlet of an oil circuit to the actuating transmission. The upper face of the motor housing has one or more oil inlet openings and the lower face has one or more oil outlet openings, the region of the oil inlet openings being covered by a filter element.

19 Claims, 2 Drawing Sheets

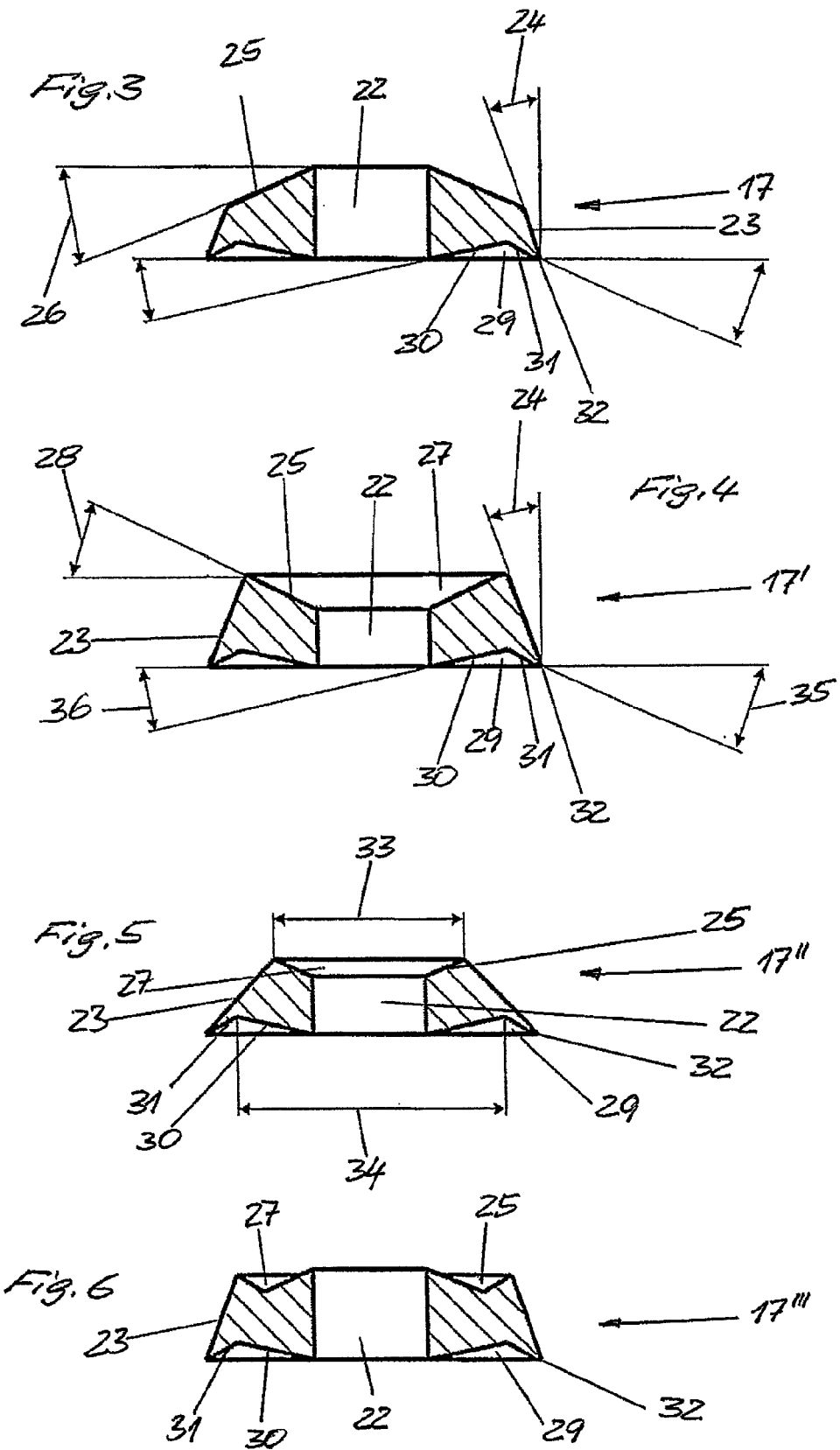

ADJUSTING DEVICE

CROSS REFERENCE TO RELATED APPLICATIONS

This is a U.S. national stage of application No. PCT/EP2010/056377, filed on May 10, 2010. Priority is claimed on German Application No. 10 2009 020 734.1, filed May 11, 2009. The contents of which are incorporated here by reference.

BACKGROUND OF THE INVENTION

Field of the Invention

The invention relates to an adjusting device with an electric motor having a motor housing and a motor shaft which is oriented perpendicularly upward away from the electric motor that carries a gear mechanism wheel of an actuating gear mechanism.

In adjusting devices of this type, friction occurs in the actuating gear mechanism, which friction reduces the degree of efficiency and leads to wear and premature failure.

Moreover, more pronounced heating of the electric motor occurs during operation.

SUMMARY OF THE INVENTION

An object of one embodiment of the invention to provide an adjusting device that exhibits low wear and low heating of the electric motor during operation with a high degree of efficiency of the power transmission.

According to one embodiment of the invention, that oil is guided from an oil outlet of an oil circuit onto the actuating gear mechanism, and the motor housing has one or more oil inlet openings on its upper side and one or more oil outlet openings on its underside, the region of the oil inlet openings being covered by a filter element.

In one embodiment, the actuating gear mechanism is lubricated and thus its frictional losses and its wear are reduced substantially.

The oil that runs from the actuating gear mechanism onto the filter element and passes through the latter can enter the motor housing through the oil inlet openings, can flow through the electric motor in a cooling manner and can exit again at the oil outlet openings.

Contaminants, in particular conductive particles in the oil which produce short circuits at the contact points of the electric motor, are filtered out by the filter element and are prevented from entering the motor housing of the electric motor.

As a result of the particles being filtered out wear of the bearing of the rotor of the electric motor is minimized, with the result that blocking of the rotor rotational movement by jamming of coarse particles in the bearings is avoided.

The throughflow quantity of oil through the motor housing and the bearings can be limited via the thickness and the throughflow cross sections of the filter element.

Excess oil can drip away in an unimpeded manner via the outer edge of the filter element and can run along the outside of the motor housing.

The actuating gear mechanism can be any type of gear mechanism. In particular, the actuating gear mechanism can be configured as a single inner eccentric mechanism or double inner eccentric mechanism, as a swash plate mechanism, Wolfrom gear mechanism, planetary gear mechanism, harmonic drive mechanism, bevel gear mechanism, or worm gear mechanism.

A variable valve stroke adjusting element of an internal combustion engine can preferably be driven by the actuating gear mechanism, it being possible, in a dual function, for the oil circuit to be the oil circuit of the internal combustion engine that has the oil outlet.

Here, the oil can be fed to the adjusting gear mechanism from the oil outlet via an oil spray nozzle.

The filter element can be mounted simply if the filter element is a filter disk with a through opening, through which the motor shaft protrudes.

If the filter disk is arranged fixedly on the motor shaft, it rotates with the motor shaft, with the result that, during this rotation, particles filtered out of the oil are flung out from the surface of the filter disk by centrifugal acceleration, and therefore the filter action is maintained for a long time.

If the motor shaft protrudes concentrically through the oil inlet opening, the oil inlet opening having a greater diameter than the motor shaft, the oil passage takes place along the motor shaft and the oil passes directly to its bearings, with the result that the latter receive lubrication reliably.

To discharge the excess oil quantity, in a simple embodiment, at least the radially outer circumferential annular region of that upper side of the filter disk that faces the gear mechanism wheel can be of inclined configuration toward the electric motor such that it is closer to the electric motor at its region of greater diameter than at its region of smaller diameter.

The upper side of the filter disk that faces the gear mechanism wheel can be inclined in a stepped manner toward the electric motor, the radially inner annular region being inclined at a smaller angle and the radially outer annular region being inclined at a greater angle.

A passage of oil through the filter disk takes place in the radially inner annular region, while the radially outer annular region serves primarily to discharge the excess oil quantity.

If the filter disk has one or more depressions on its upper side that faces the gear mechanism wheel, one or more reservoirs is formed, in which oil is stored which, in the event of an interruption of the oil circuit or a reduction in the oil flow, ensures that oil still continues to be introduced through the filter disk into the motor housing.

The depression is preferably a radially circumferential annular depression, with the result that a passage of oil through the filter disk takes place in a uniformly distributed manner at the circumference.

If the upper side of the filter disk has a radially outer annular region and a radially inner annular region, the depressions being formed on the radially inner annular region, the oil reservoir or reservoirs is/are situated in the radially inner annular region and the discharge of excess oil is situated in the radially outer annular region.

The annular depression can be formed in a simple way by the fact that the radially inner annular region of the filter disk is inclined with respect to the motor shaft in such a way that it is closer to the electric motor at its radially inner diameter than at its radially outer diameter.

In another embodiment the depressions have an approximately V-shaped or U-shaped cross section.

If that underside of the filter disk that faces the electric motor is inclined in a stepped manner with respect to the motor shaft, the radially inner annular region approaching the electric motor from its radially outer diameter to its radially inner diameter, and the radially outer annular region approaching the electric motor from the radially outer diameter of the inner annular region to its radially outer diameter, the radially inner annular region forms a conical collecting face, on which the oil which has passed through the filter disk is guided to the motor shaft.

The oil is guided on the radially outer annular region to the outer edge of the filter disk.

Here, the radially outer circumferential edge of the filter disk preferably has a circumferential drip edge which is directed toward the electric motor, with the result that it is prevented that contaminated oil which comes from the upper side of the filter disk can flow on the outside of the underside of the filter disk to the motor shaft and can penetrate into the motor housing.

The filter element can be composed of any suitable material, such as a wire mesh.

In a manner which is particularly easy and inexpensive to produce, the filter element is a porous material, in particular of a sintered material.

BRIEF DESCRIPTION OF THE DRAWINGS

Exemplary embodiments of the invention are shown in the drawing and will be described in greater detail in the following text. In the drawing:

FIG. 3 is a cross section of the filter element according to FIG. 2;

FIG. 4 is a second exemplary embodiment of a filter element in cross section;

FIG. 5 is a third exemplary embodiment of a filter element in cross section; and FIG. 6 is a fourth exemplary embodiment of a filter element in cross section.

DETAILED DESCRIPTION OF THE PREFERRED EMBODIMENTS

Figure 1:
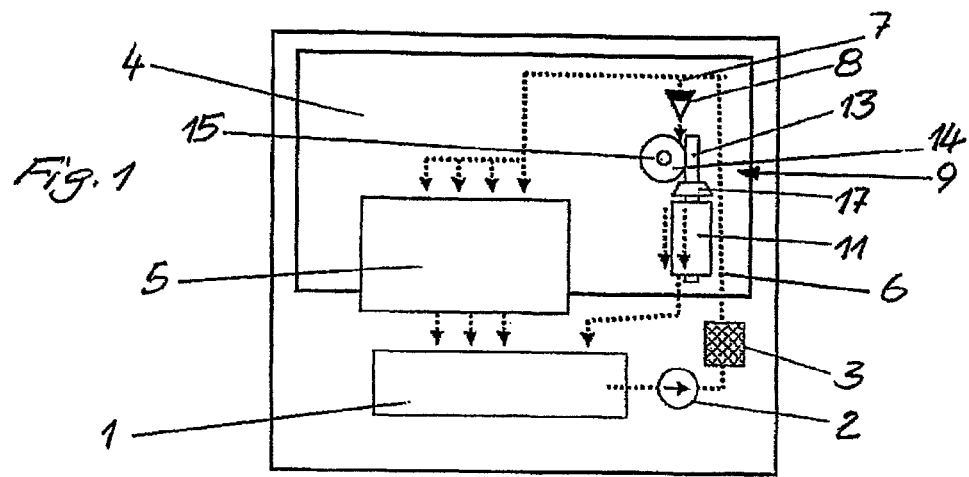
FIG. 1 is a system of an oil circuit of an internal combustion engine with a variable valve stroke adjusting element.

The system shown in FIG. 1 of an oil circuit of an internal combustion engine with a variable valve stroke adjusting element 9 has an oil sump 1, from which oil is conveyed by means of an oil pump 2 via an oil filter 3 to a cylinder head 4 and further consumers 5, which oil flows back from there into the oil sump 1.

An oil outlet 7 is arranged in the oil line 6 which leads from the oil sump 1 to the cylinder head 4, at which oil outlet 7 a part stream is branched off and is guided via an oil spray nozzle 8 to the variable valve stroke adjusting element 9 of the internal combustion engine.

The variable valve stroke adjusting element 9 has an electric motor 11 which is arranged in a motor housing 10 and the motor shaft 12 of which protrudes perpendicularly upward out of the motor housing 10 and is configured at its free end region as a worm 13 of a worm gear mechanism.

A worm gear 14 of the worm gear mechanism engages into the worm 13, which worm gear 14 is arranged fixedly on a camshaft 15.

Oil is guided by the oil spray nozzle 8 onto the engagement region of the worm gear 14 into the worm 13, which oil lubricates in this engagement region and then, on account of gravity 16, runs, in particular, along the worm 13 and the motor shaft 12 toward the electric motor 11.

A filter disk 17 made from a sintered material is arranged fixedly on the motor shaft 12 between the worm 13 and the motor housing 10.

Part of the oil passes through the filter disk 17 and passes to an oil inlet opening 18 of the motor housing 10, which oil inlet opening 18 encloses the motor shaft 12 with a radial spacing, and can thus flow into said motor housing 10.

Here, the oil flows through a first bearing 19 of the motor shaft 12 in the upper end region of the motor housing 10. After flowing around the parts of the electric motor 11 and flowing through the second bearing 20 of the motor shaft 12 in the lower end region of the motor housing 10, the oil then exits the motor housing again at an oil outlet opening 21 and is guided back into the oil sump 1.

The oil outlet opening 21 likewise encloses the motor shaft 12 at a radial spacing.

The various exemplary embodiments of the filter disk 17, 17', 17" and 17''' are all configured as round disks; it goes without saying that the filter disks can also have another circumferential contour. (FIGS. 2-6)

In the center, the filter disks 17 to 17''' have a through opening 22, with which they enclose the motor shaft 12.

On their upper side which faces the worm 13, the filter disks to 17''' have a radially outer circumferential annular region 23 which is inclined toward the electric motor 11 in such a way that it is closer to the electric motor 11 at its region of greater diameter than at its region of smaller diameter.

In FIG. 3, the inclination 24 with respect to the longitudinal extent of the motor shaft 11 is greater than approximately 5°.

The outer diameter of the filter disk 17 to 17''' is greater than the external diameter of the motor housing 10 in the end region which faces the filter disks 17 to 17'''.

Furthermore, on its upper side which faces the worm 13, the filter disks 17 to 17''' have a radially inner circumferential annular region 25 which reaches as far as the outer annular region 23.

Figure 2:
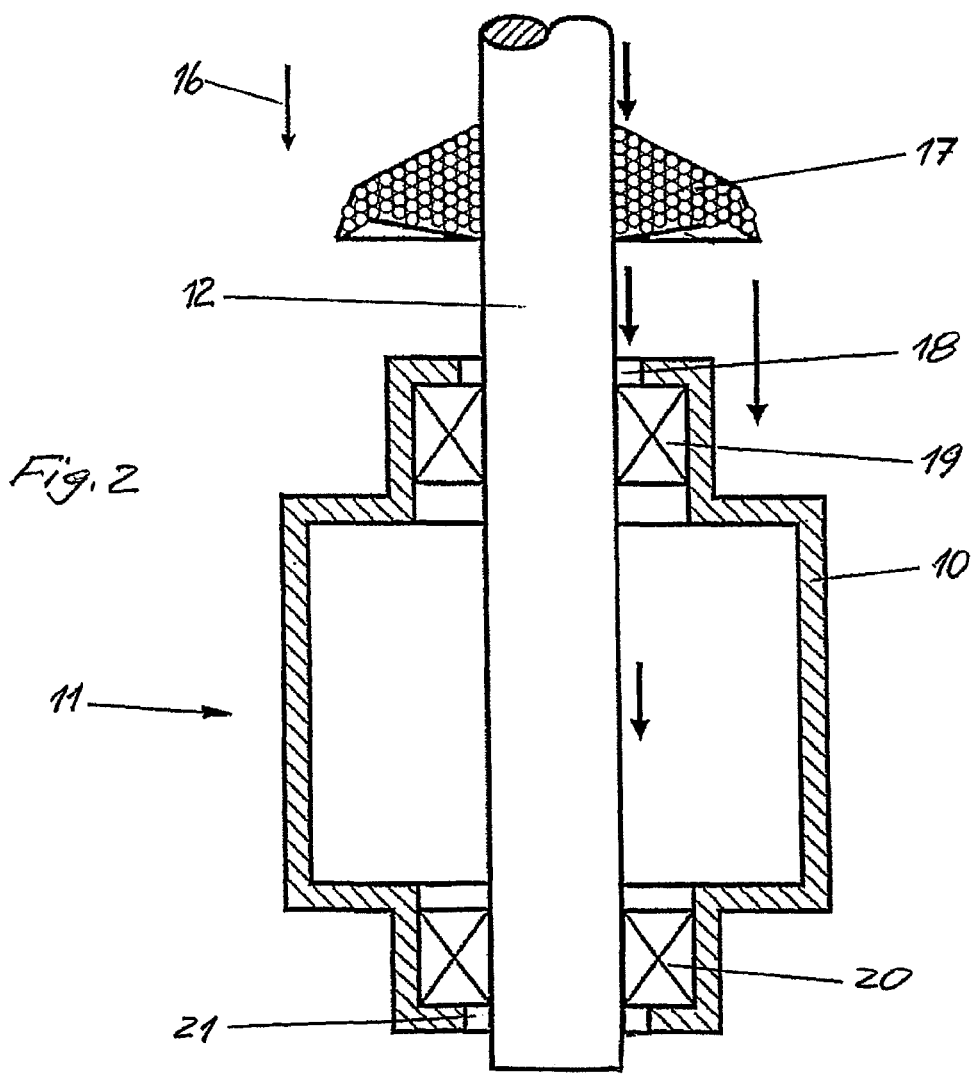
FIG. 2 is an enlarged illustration of an electric motor with a filter element of the system according to FIG. 1.

In FIGS. 2 and 3, the inner annular region 25 likewise has an inclination 26 such that it is closer to the electric motor 11 at its region of greater diameter than at its region of smaller diameter, which region reaches radially to the inside as far as the motor shaft 12.

The inclination 26 is greater with respect to a radial to the motor shaft 12 than the inclination 24. It can preferably be an angle between approximately 20° and 40°.

In FIGS. 4 to 6, a radially circumferential annular depression 27, by which an oil reservoir is formed, is configured in the inner annular region 25.

In FIGS. 4 and 5, in addition, the radially inner annular region 25 is inclined with respect to the longitudinal extent of the motor shaft 12 in such a way that it is closer to the electric motor 11 at its radially inner diameter than at its radially outer diameter.

The inclination 28 with respect to a radial to the motor shaft 12 is preferably greater than 20°.

In FIG. 6, the annular depression has an approximately V-shaped cross section, the radially inner limb of the "V" reaching axially further to the worm 13 than the radially outer limb of the "V", with the result that an overflow of oil out of the annular depression 27 always takes place radially to the outside.

An underside of the filter disk 17 to 17''' that faces the electric motor 11 is provided with a radially circumferential second annular depression 29 of V-shaped cross section in such a way that its radially inner circumferential annular region 30 approaches the electric motor 11 from its radially outer diameter to its radially inner diameter.

The radially outer open annular region 31 approaches the electric motor 11 from the radially outer diameter of the inner annular region 30 to its radially outer diameter.

The outer annular region 31 can have an inclination 35 of approximately greater than 30° with respect to a radial to the longitudinal extent of the motor shaft 11.

The inner annular region 30 preferably has an inclination 36 of approximately greater than 5° with respect to a radial to the longitudinal extent of the motor shaft 11.

A radially circumferential drip edge 32 is formed where the outer annular regions 23 and 31 adjoin one another.

In the exemplary embodiments of FIGS. 4 to 6, the outer diameter 33 of the inner annular region 25 is smaller than the outer diameter 34 of the inner annular region 30.

The oil that passes through the filter disks 17' to 17''' from the annular depression 27 runs completely on the inner annular region 30 to the motor shaft 12 and along the latter into the interior of the motor housing 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjusting device comprising:
   a gear mechanism wheel of an actuating gear mechanism;
   a filter element configured as a filter disk with a through opening;
   an electric motor;
   a motor housing of the electric motor;
   a motor shaft of the electric motor oriented perpendicularly upward away from the electric motor that carries the gear mechanism wheel of the actuating gear mechanism, wherein the motor shaft protrudes through the through opening of the filter element;
   an oil outlet of an oil circuit configured to guide oil onto the actuating gear mechanism;
   at least one upper oil inlet opening arranged on a vertically upper side of the motor housing, a region of the at least one upper oil inlet opening being covered by the filter element; and
   at least one lower oil outlet opening of the motor housing arranged on a vertically underside of the motor housing.

2. The device as claimed in claim 1, wherein the actuating gear mechanism is configured as one of a single inner eccentric mechanism, a double inner eccentric mechanism, a swash plate mechanism, a Wolfrom gear mechanism, a planetary gear mechanism, a harmonic drive mechanism, a bevel gear mechanism, and a worm gear mechanism.

3. The device as claimed in claim 1, wherein a variable valve stroke adjusting element of an internal combustion engine is driven by the actuating gear mechanism.

4. The device as claimed in claim 3, wherein the oil circuit is an internal combustion engine oil circuit.

5. The device as claimed in claim 1, wherein the motor shaft protrudes concentrically through the upper oil inlet opening, the upper oil inlet opening having a greater diameter than the motor shaft.

6. The device as claimed in claim 5, wherein the filter element is a sintered material.

7. The device as claimed in claim 5, wherein at least a radially outer circumferential annular region of an upper side of the filter disk which faces the gear mechanism wheel is of inclined configuration toward the electric motor in such a way that it is closer to the electric motor at its region of greater diameter than at its region of smaller diameter.

8. The device as claimed in claim 5, wherein an underside of the filter disk that faces the electric motor is inclined in a stepped manner with respect to the motor shaft, a radially inner annular region approaching the electric motor from its radially outer diameter to its radially inner diameter, the radially outer annular region approaching the electric motor from the radially outer diameter of the inner annular region to its radially outer diameter.

9. The device as claimed in claim 1, wherein at least a radially outer circumferential annular region of an upper side of the filter disk which faces the gear mechanism wheel is of inclined configuration toward the electric motor in such a way that it is closer to the electric motor at its region of greater diameter than at its region of smaller diameter.

10. The device as claimed in claim 9, wherein the upper side of the filter disk which faces the gear mechanism wheel is inclined in a stepped manner toward the electric motor, a radially inner annular region being inclined at a smaller angle and the radially outer annular region being inclined at a greater angle.

11. The device as claimed in claim 1, wherein the filter disk has at least one depression on its upper side that faces the gear mechanism wheel.

12. The device as claimed in claim 11, wherein the depression is a radially circumferential annular depression.

13. The device as claimed in claim 11, wherein the upper side of the filter disk has a radially outer annular region and a radially inner annular region, the depressions being formed on the radially inner annular region.

14. The device as claimed in claim 13, wherein the radially inner annular region of the filter disk is inclined with respect to the motor shaft in such a way that it is closer to the electric motor at its radially inner diameter than at its radially outer diameter.

15. The device as claimed in claim 11, wherein the depression has one of a V-shaped and U-shaped cross section.

16. The device as claimed in claim 1, wherein an underside of the filter disk that faces the electric motor is inclined in a stepped manner with respect to the motor shaft, a radially inner annular region approaching the electric motor from its radially outer diameter to its radially inner diameter, the radially outer annular region approaching the electric motor from the radially outer diameter of the inner annular region to its radially outer diameter.

17. The device as claimed in claim 1, wherein the radially outer circumferential edge of the filter disk has a circumferential drip edge directed at least toward the electric motor.

18. The device as claimed in claim 1, wherein the filter element is a porous material.

19. The device as claimed in claim 1, further comprising:
   a first bearing arranged at the vertically upper side of the motor housing and configured to support the shaft; and
   a second bearing arranged at the underside of the motor housing and configured to support the shaft, wherein the first and second bearings are arranged between the at least one upper oil inlet opening and the at least one lower oil outlet opening.

* * * * *